W. V. TURNER.
FLUID PRESSURE BRAKE.
APPLICATION FILED MAR. 6, 1917.
1,256,490.
Patented Feb. 12, 1918.
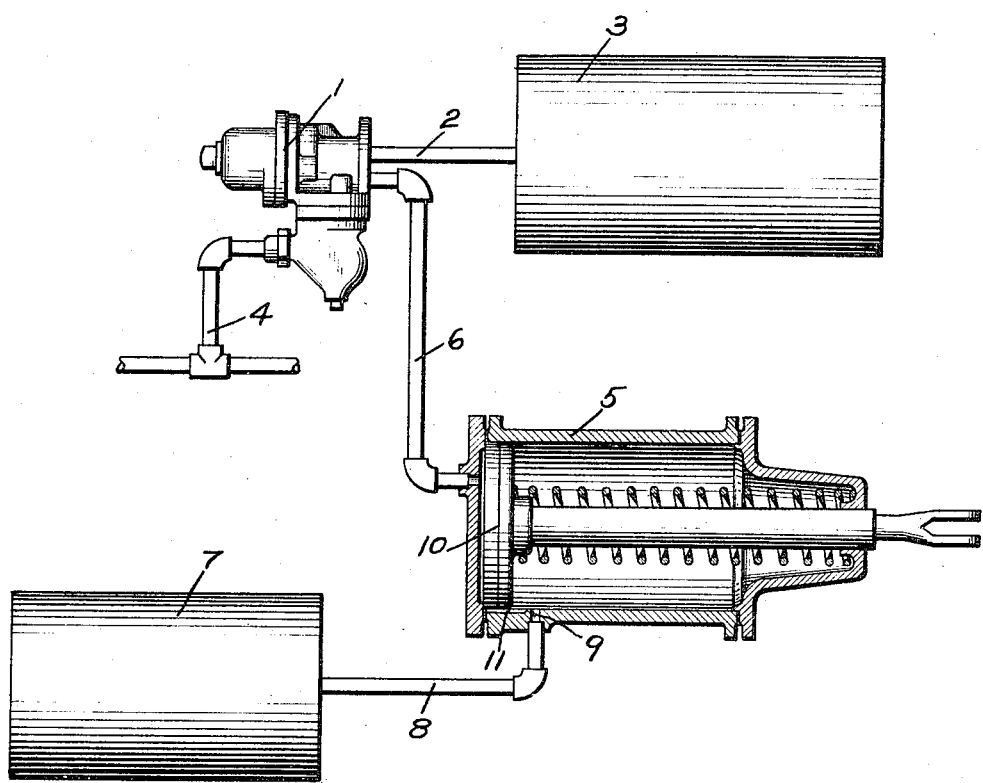
INVENTOR
Walter V. Turner.
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,256,490.          Specification of Letters Patent.     Patented Feb. 12, 1918.

Application filed March 6, 1917. Serial No. 152,520.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes as employed on railway vehicles.

The standard fluid pressure brake is provided with an auxiliary reservoir of such volume that for a predetermined brake cylinder piston travel, the brake cylinder pressure obtained will closely correspond with the degree of reduction in brake pipe pressure, so as to provide a flexible brake control.

When heavy brake applications are made, the brake cylinder piston travel is liable to exceed the predetermined piston travel, by reason of the spring of the brake rigging and the drag of the brake shoes around the wheels, and the so-called false piston travel so produced causes the slack adjuster to take up slack to such an extent that when a light application of the brakes is thereafter made, the brake cylinder piston travel may be excessively short. The consequence of a short brake cylinder piston travel is that a high brake cylinder pressure is obtained for a given reduction in brake pipe pressure impairing the flexibility of the brake and producing rough stops.

In order to reduce the brake cylinder pressure obtained under the above conditions, it has been proposed to connect a reservoir or chamber with the brake cylinder, so that the brake cylinder volume is increased in effect and thus a reduced brake cylinder pressure will be obtained for a given reduction in brake pipe pressure.

It has been found, however, that connecting a reservoir to the brake cylinder may prevent the movement of the brake cylinder piston because the usual leakage groove around the brake cylinder piston allows the escape of fluid before the pressure can be built up in the brake cylinder and the reservoir.

In order to overcome this difficulty, according to the principal object of my invention, it is proposed to connect the volume reservoir to the brake cylinder after the brake cylinder piston has moved to close the leakage groove.

In the accompanying drawing, the single figure is a diagrammatic view, partly in section, of a fluid pressure brake equipment embodying my invention.

As shown, the equipment may comprise the usual triple valve device 1, connected by pipe 2 to auxiliary reservoir 3, brake pipe 4, and brake cylinder 5 connected to the triple valve device by pipe 6.

According to my invention, a volume reservoir 7 is provided, which is connected by pipe 8 with a port 9 in the wall of the brake cylinder 5, the port 9 being located so that the brake cylinder piston 10 must move out sufficiently to close the leakage groove 11 before said port is opened to the pressure side of the brake cylinder piston.

When the brakes are applied, fluid is supplied by the usual operation of the triple valve device 1 from auxiliary reservoir 3 through pipe 6 to the pressure side of brake cylinder piston 10 and the brake cylinder piston is thereupon moved outwardly closing the leakage groove 11.

Further movement of the brake cylinder piston then opens port 9 to the pressure side of the piston, so that fluid supplied to the brake cylinder also flows into the reservoir 7 and thus prevents the rapid build up of pressure in the brake cylinder.

Having now described my invention, what I claim as new and desire to secure by Letters Patent, is:

1. In a fluid pressure brake, the combination with a brake cylinder containing a brake cylinder piston, of a reservoir adapted to be connected to the pressure side of said piston upon a predetermined brake cylinder piston travel.

2. In a fluid pressure brake, the combination with a brake cylinder containing a brake cylinder piston, of a reservoir normally cut off from the pressure side of the brake cylinder piston and adapted to be connected thereto upon movement of the brake cylinder piston in applying the brakes.

3. In a fluid pressure brake, the combination with a brake cylinder containing a brake cylinder piston, of a reservoir adapted to be connected to the brake cylinder through a port controlled by the brake cylinder piston.

4. In a fluid pressure brake, the combination with a brake cylinder containing a brake cylinder piston and having the usual leakage groove around said piston, of a reservoir adapted to be connected to the pressure side of said piston upon movement thereof to close the leakage groove.

In testimony whereof I have hereunto set my hand.

WALTER V. TURNER.

Copies of this patent may be obtained for five cents each, by addressing the "Commissioner of Patents, Washington, D. C."